K. KOEL.
CARRIAGE BOLT SOCKET.
APPLICATION FILED NOV. 25, 1921.

1,437,811.

Patented Dec. 5, 1922.

Inventor
Klaas Koel

Patented Dec. 5, 1922.

1,437,811

UNITED STATES PATENT OFFICE.

KLAAS KOEL, OF INWOOD, IOWA.

CARRIAGE-BOLT SOCKET.

Application filed November 25, 1921. Serial No. 517,825.

*To all whom it may concern:*

Be it known that I, KLAAS KOEL, a citizen of the United States, residing at Inwood, in the county of Lyon and State of Iowa, have invented certain new and useful Improvements in Carriage-Bolt Sockets, of which the following is a specification.

The invention has reference to a bolt-lock for holding the bolt from turning when screwing or unscrewing the nut.

An additional object is to provide a bolt-lock in the form of a socket attachable to carriage bolts and particularly useful in connection with the repairing of old machinery when nuts are rusted to the bolt and it is desired to remove the latter.

An additional object is to provide a bolt socket adapted to be driven into old or new bolt holes and provided with means for retaining itself in place, the socket serving to prevent the turning of the bolt during the unloosening or tightening of the nut.

A further object of the invention is to provide a device of the above character that is simple in construction, strong and durable, and which it is believed may be manufactured at a reasonably low cost.

Various other objects and advantages of the invention will become apparent during the continuance of the following description.

In the drawings:—

Figure 1:
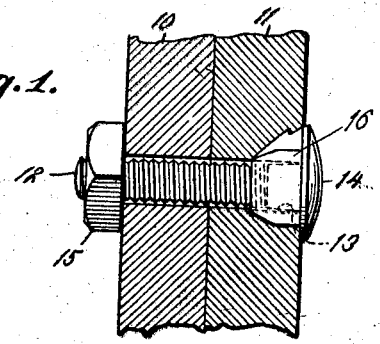
Figure 1 is a sectional view illustrating the manner of applying the invention.
Figure 2:
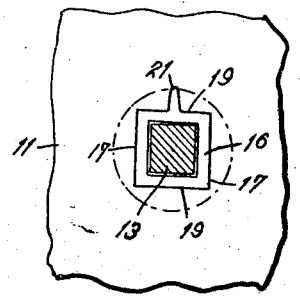
Figure 2 is a plan view of the bolt-socket, the head of the bolt being removed to more clearly disclose the socket.
Figure 4:
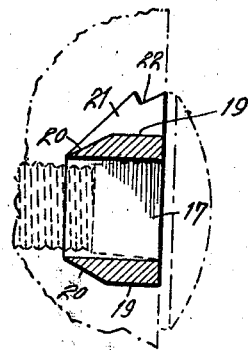
Figure 4 is a cross section thereof taken on line 4—4 of Figure 3.
Figure 3:
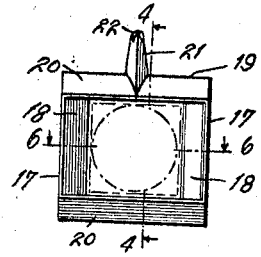
Figure 3 is a bottom plan view of the socket.
Figure 5:
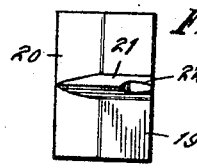
Figure 5 is a side view of the socket.
Figure 6:
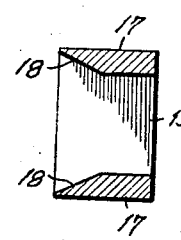
Figure 6 is a cross sectional view thereof taken on line 6—6 of Figure 3.

The invention is particularly adapted to the repairing of old machinery and serves to provide means for keeping such machinery in shape.

In the drawings, 10 and 11 designate machine parts held together by carriage bolt 12. As is well known, every carriage bolt is provided with a shoulder 13 under the head 14 which, if it exceeds the diameter of the bolt shank at all, exceeds it only by a very slight degree and for that reason the bolt hole is generally made the same size of the bolt. Consequently, the bolt has to be driven into the wooden support 11 so that it will not turn when the nut 15 is tightened. However, the nut frequently becomes rusted on the bolt and when it is required to loosen or tighten the nut the shoulder is unable to prevent the bolt from turning, or, on the other hand, the bolt is so solidly driven into the wood that it is spoiled when driven out. It is the purpose of this invention to obviate difficulty in replacing a carriage bolt and to permit such replacements to be effected conveniently and without destruction to either the bolt or machine. This is accomplished by the provision of a square board, tubular socket 16 made from any suitable material and adapted to be driven in either the old or a new bolt hole provided to receive the same.

The side walls 17 are made straight on the outside and bevelled on the inside to provide penetrating edges 18 as shown. These edges prevent the wood from splitting when the socket is driven in place. The end walls 19, on the other hand, have their edges bevelled on the outside as indicated at 20 so that the socket can be more easily driven into the wood support. By having the end and side walls alternately bevelled upon their respective inner and outer faces, the placing of the socket in proper position is more easily accomplished since these alternating bevels serve to guide the socket during the driving operation and prevent it from being positioned inaccurately.

Projecting laterally from one face of the socket is a wedge-shaped lip 21, extending vertically of the socket and positioned centrally between the side edges thereof as illustrated. This lip is provided on its cutting edge with a notch 22 into which the fibers of the wood support 11 are permitted to expand for retaining the socket in place in the bolt hole. The notched lip braces the socket against any torsional strain and serves to hold it more firmly in place. In the practical application of the invention the support 11 may be prepared with a socket-recess conforming to the shape of the socket or the latter can be used to form its own socket by being forcibly driven into the wood, the bevelled edges at the penetrating end of the latter serving to cut away through the fibers of the wood until the socket is properly placed. The carriage bolt may then be inserted into the socket with the shoulder 13 encased within the socket and held against turning movement therein. The bolt will thus be held against any turning movement regardless of the torsional strain exerted upon it by the turning of nut 15 and since it is loosely connected with the socket, it may be readily removed therefrom subsequent to the unscrewing of the nut.

As is obvious, the socket can be constructed of various sizes to fit different bolts and may likewise be constructed in any shape or design to suit the occasion.

From the foregoing it is believed that the advantages and novel features of the invention have been readily understood and therefore further detailed description is deemed unnecessary.

What is claimed is:—

1. An anti-turning device for bolts and the like, comprising a flat-sided bolt socket having a penetrating edge alternately bevelled on the inner and outer sides throughout its perimeter.

2. An anti-turning device for bolts and the like, comprising a flat-sided socket adapted to be placed at one end of bolt hole and having a penetrating edge alternately bevelled on the inner and outer sides throughout its perimeter, and a projection laterally of one side of the socket to provide anchoring means therefor.

3. An anti-turning device for bolts and the like, comprising a flat-sided tubular socket adapted to be placed at one end of a bolt hole and having a penetrating edge bevelled alternately on the inner and outer sides of the socket throughout its perimeter, and a notched retaining lip projecting laterally from one side of the socket.

4. An anti-turning device for bolts and the like, comprising a flat-sided bolt socket and a notched retaining lip projecting laterally from one side of the socket.

5. An anti-turning device for bolts and the like, comprising a flat-sided bolt socket adapted to be positioned at one end of a bolt hole and having a penetrating edge bevelled alternately on the inner and outer side of the socket and a wedge-shaped retaining lip projecting laterally from one side of the socket to provide retaining means therefor.

6. An anti-turning device for shouldered bolts and the like, comprising a flat-sided, tubular, socket adapted to be placed at one end of a bolt hole for receiving the shoulder of the bolt, said socket having end walls provided with outside bevels adjacent the penetrating end, and side walls provided at their penetrating ends with inside bevels said inside and outside bevels serving as guides for positioning the socket with respect to the bolt holes when forcibly driven in place.

In testimony whereof I affix my signature.

KLAAS KOEL.